(12) United States Patent
Lammel et al.

(10) Patent No.: US 8,522,069 B2
(45) Date of Patent: Aug. 27, 2013

(54) PROCESS FOR SECURE BACKSPACING TO A FIRST DATA CENTER AFTER FAILOVER THROUGH A SECOND DATA CENTER AND A NETWORK ARCHITECTURE WORKING ACCORDINGLY

(75) Inventors: Nico Lammel, Paderborn (DE); Helmut Finke, Paderborn (DE)

(73) Assignee: Wincor Nixdorf International GmbH (DE)

( * ) Notice: Subject to any disclaimer, the term of this patent is extended or adjusted under 35 U.S.C. 154(b) by 317 days.

(21) Appl. No.: 13/010,453

(22) Filed: Jan. 20, 2011

(65) Prior Publication Data
US 2011/0179305 A1      Jul. 21, 2011

Related U.S. Application Data

(60) Provisional application No. 61/296,919, filed on Jan. 21, 2010.

(51) Int. Cl.
*G06F 11/00*           (2006.01)

(52) U.S. Cl.
USPC .................................. 714/4.21; 714/4.11

(58) Field of Classification Search
USPC ............................. 714/4.21, 11–13, 4.11
See application file for complete search history.

(56) References Cited

U.S. PATENT DOCUMENTS

| | | | |
|---|---|---|---|
| 4,775,976 A * | 10/1988 | Yokoyama | 714/4.4 |
| 5,313,664 A * | 5/1994 | Sugiyama et al. | 705/21 |
| 6,272,529 B1 * | 8/2001 | Lum | 709/203 |
| 6,622,259 B1 * | 9/2003 | Schmuck | 714/4.21 |
| 7,203,728 B2 * | 4/2007 | Lum | 709/208 |
| 7,478,277 B2 * | 1/2009 | Lomet et al. | 714/15 |
| 8,086,895 B2 * | 12/2011 | Maki et al. | 714/4.11 |
| 2002/0147702 A1 | 10/2002 | Nielsen | |
| 2003/0061319 A1 * | 3/2003 | Manzardo | 709/221 |
| 2005/0160312 A1 * | 7/2005 | Seng et al. | 714/13 |

FOREIGN PATENT DOCUMENTS

DE      600 33 895 T2      12/2007

OTHER PUBLICATIONS

"Computer cluster", Wikipedia, Jan. 19, 2011, pp. 1-6, http:/en.wikipedia.org/wiki/Computer_cluster.
"Oracle RAC", Wikipedia, Jan. 19, 2011, pp. 1-4, http:/en.wikipedia.org/wiki/Oracle_RAC.

* cited by examiner

*Primary Examiner* — Yolanda L Wilson
(74) *Attorney, Agent, or Firm* — Harness, Dickey & Pierce, P.L.C.

(57) ABSTRACT

A method (100) is proposed for safely switching back to a first computer center (DC1) following failover by a second computer center (DC2), where at least one transaction terminal is connected as a client (CLA) to the second computer center (DC2) during the downtime of the first computer center (DC1) and at the end of the downtime is switched back again to the first computer center (DC1), where the following steps are performed: the second computer center (DC2) is shown that the first computer center (DC1) is operational again (step 110); the client (CLA) is prompted to go out of service (step 120); synchronization (STD) of configuration and/or transaction data between the first and second computer centers is performed (step 130); at the conclusion of synchronization (STD), the client (CLA) is prompted to switch back to the first computer center (DC1) (step 140).

7 Claims, 9 Drawing Sheets

PROCESS FOR SECURE BACKSPACING TO A FIRST DATA CENTER AFTER FAILOVER THROUGH A SECOND DATA CENTER AND A NETWORK ARCHITECTURE WORKING ACCORDINGLY

CROSS-REFERENCE TO RELATED APPLICATIONS

This application claims the benefit and priority of U.S. Provisional Application Ser. No. 61/296,919, filed Jan. 21, 2010. The entire disclosure of the above application is incorporated herein by reference.

BACKGROUND OF THE INVENTION

Technical Field

The invention relates to a method for safely switching back to a first computer center following failover by a second computer center and a network structure operating accordingly. The invention relates specifically to a method for failover and to safely switching back a client or a cluster of clients that are configured as transaction terminals, specifically as self-service terminals (e.g. as cash dispensers/ATMs) account statement printers or money transfer terminals, and that are preferably connected to the first computer center and are connected to the second computer terminal only for failover, when synchronization data are exchanged between the two computer centers.

Particularly in the field of transaction terminals and networks that are designed for financial transactions, the transaction terminals can usually be connected to more than one computer center or data center in order to have sufficient backup in the event that the preferred computer center fails. At least one of the additional computer centers then serves as the backup computer center and assumes the tasks of the preferred computer center for the period of downtime. It is known that configuration and transaction data from the connected terminals must be synchronized between the two computer centers. However, if the two computer centers or data centers are at a very great distance from one another, problems can arise with synchronization since the synchronization processes are generally very time-critical. This affects high-availability clusters in particular (known as HA clusters for short; refer also to http:/en.wikipedia.org/wiki/Computer cluster), on which services run continuously on all nodes and thus genuine active/active operation is possible.

Known database management systems also comprise appropriate synchronization mechanisms, such as Oracle RAC (Oracle Real Application Cluster; Oracle® is a registered trade mark of the Oracle Corporation, Redwood Shores, Canada). The Oracle RAC described at http:/en.wikipedia.org/wiki/Oracle. RAC enables failover when several nodes of a cluster access the same database and makes database services available for client computers. If one of the nodes fails, the others assume its functionality. However, it has been shown that these synchronization mechanisms only operate reliably when the databases concerned are not a too great a distance from each other, i.e. are not more than about 25 km from each other. In many network architectures, computer centers and their databases are networked that lie considerably further apart from each other so that on occasion distances of several thousand kilometers have to be overcome. The employment of conventional mechanisms cannot prove successful, particularly in active/active operation; reliable synchronization then requires very great expense with respect to the hardware to be used (including special fiber optic cables, such as dark fiber for example) or it appears to be quite impossible.

Network architectures of the type referred to at the beginning in which preferably transaction terminals, specifically cash dispensers (ATMs; automated teller machines) are connected to computer centers are described in US 2002/0147702 A1 or DE 600 33 895 T2 for example. The problem of safely switching back to the preferred computer center following failover by a far distant backup computer center is, however, not addressed.

SUMMARY OF THE INVENTION

An object of the invention is to propose a method for safely switching back to a first computer center after failover by a second computer center that can be employed even in the case of computer centers widely separated from each other without losing transaction data. A network structure shall also be proposed to carry out the method. Specifically, the method should be applicable to financial transaction terminals and computer centers connected thereto.

Accordingly, a method is proposed in which at least one transaction terminal is connected as a client to the second computer center during the downtime of the first computer center and in which, at the end of the downtime, said terminal is switched back to the first computer center by:

displaying a signal to the second computer center that the first computer center is operational again;
prompting the client to go out of service;
synchronizing configuration and/or transaction data between the first and the second computer centers; and
prompting the client to switch back to the first computer center at the conclusion of synchronization.

Consequently, the particular client is briefly taken out of service in order to synchronize configuration and/or transaction data safely during this time and to activate the client again only when synchronization is completed.

To the extent that several clients or transaction terminals are involved that have the same preferred computer center and are to be switched back to said computer center, it is advantageous to take one terminal after the other out of service and to activate them again following successful synchronization or re-synchronization.

In the preferred embodiments, the at least one client is a self-service terminal, specifically a cash dispenser, account statement printer, money transfer terminal, that is preferably connected to a first computer center and is connected to the second computer center only for failover.

BRIEF DESCRIPTION OF THE DRAWINGS

In what follows, the invention is described using embodiments and with reference to the appended drawings that represent the following.

DESCRIPTION OF THE PREFERRED EMBODIMENTS

Figure 1A:
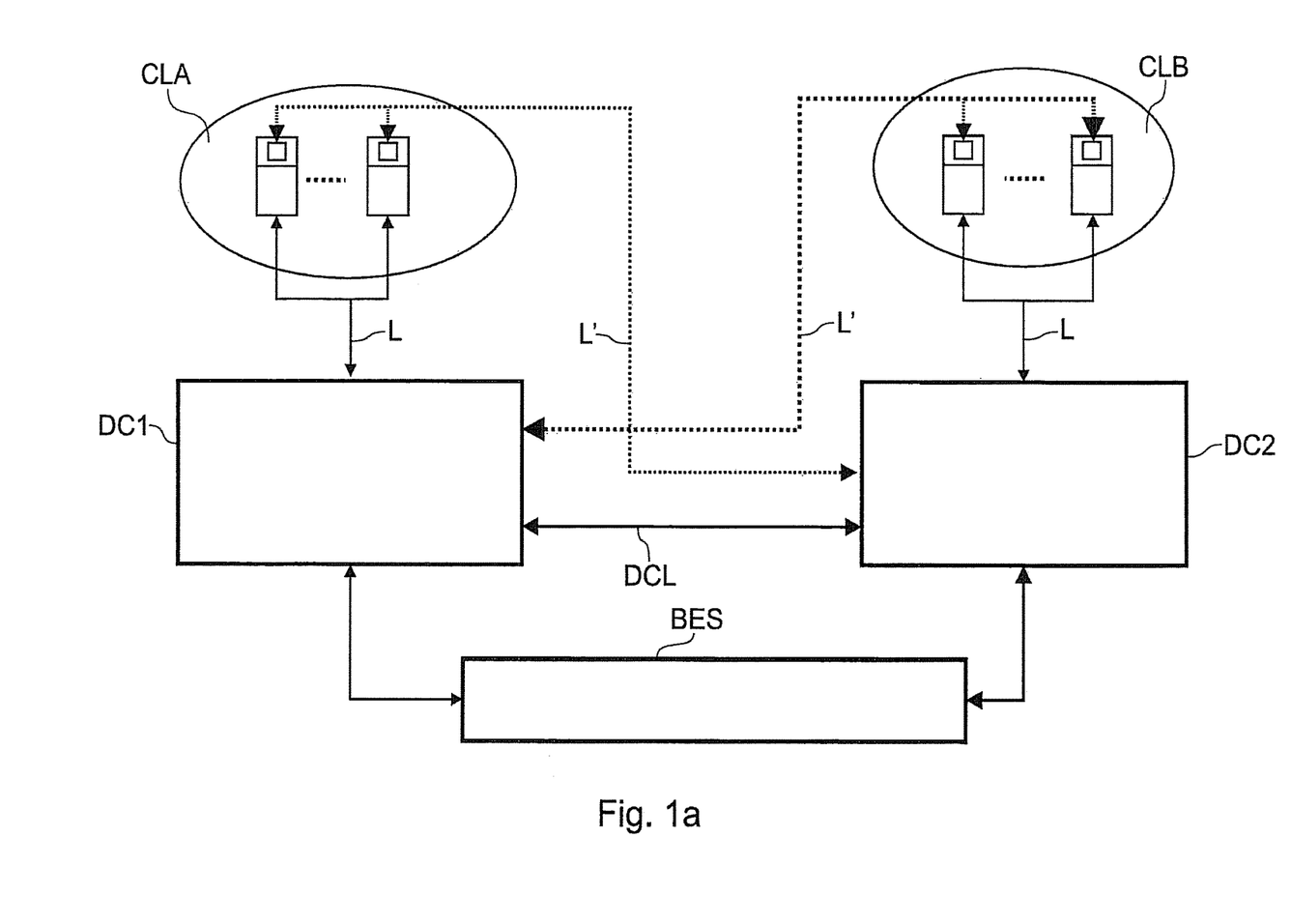
FIGS. 1a/b show a network structure with two computer centers and several transaction terminals connected thereto.

FIG. 1a shows a network structure with two computer centers DC1 and DC2, in the form of a block diagram, and several financial transaction terminals connected thereto in the form of cash dispensers that are connected as clients CLA or CLB to the computer centers. First clients CLA have first computer center DC1 as their preferred computer center and access second computer center DC2, which then serves as backup computer center for clients CLA, only for failover. Accordingly, first client CLA, or cluster of first clients, is normally connected by way of a data line L to first computer center DC1.

Figure 1B:
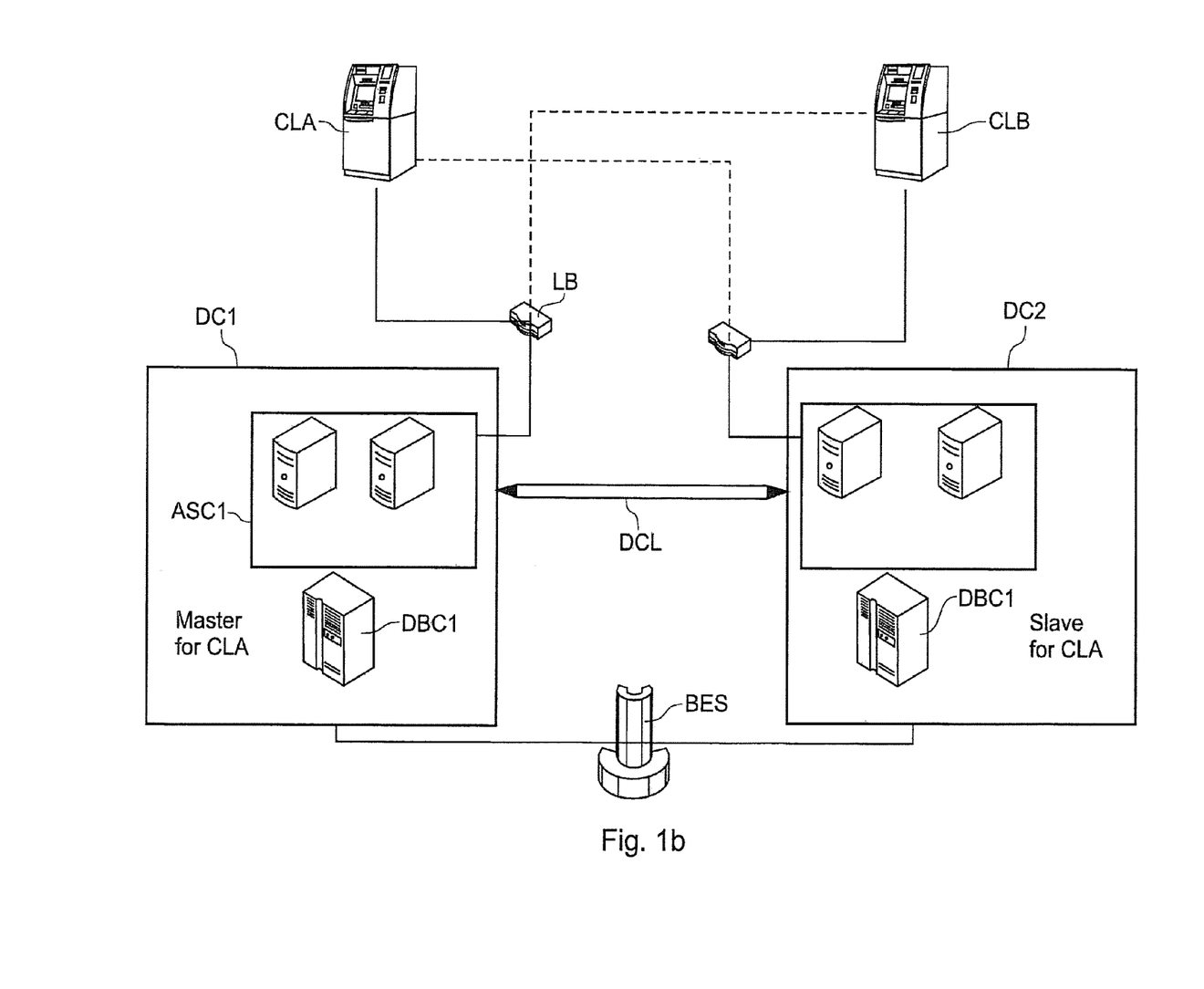

These computer centers or data centers are situated at different locations that may well be at very great distances from each other. In the event of a failure of first (preferred) computer center DC1, a fallback connection to second computer center DC2 is created over data line L'. For clients CLB, or terminals of the other cluster, the situation is reversed, i.e. computer center DC2 is the preferred and is replaced temporarily by computer center DC1 only in the event of a failure. Computer centers DC1 and DC2 may be connected to each other over a data link DCL (for purposes of synchronization and the like) and are in turn connected to a backend system BES, in this instance the accounting system. FIG. 1b shows the network architecture already described in greater detail, where only one client, CLA or CLB respectively, is shown on each side as an example. The further FIGS. 2a/b and FIGS. 3a-d build on the basic structure shown in FIGS. 1a/b and reproduce various situations.

Figure 2A:
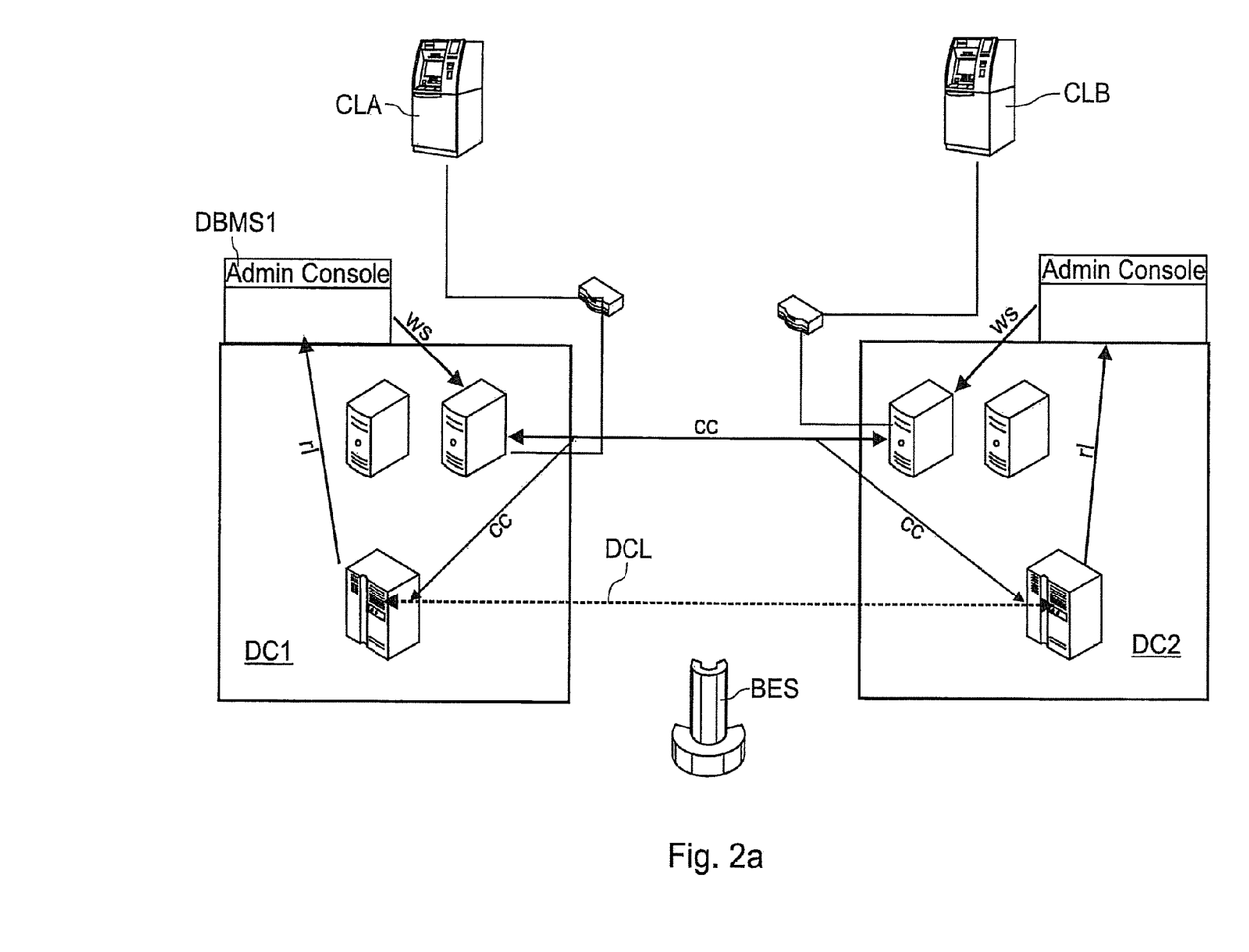
FIGS. 2a/b illustrate normal operation which comprises performing configuration changes and processing transactions.
Figure 2B:
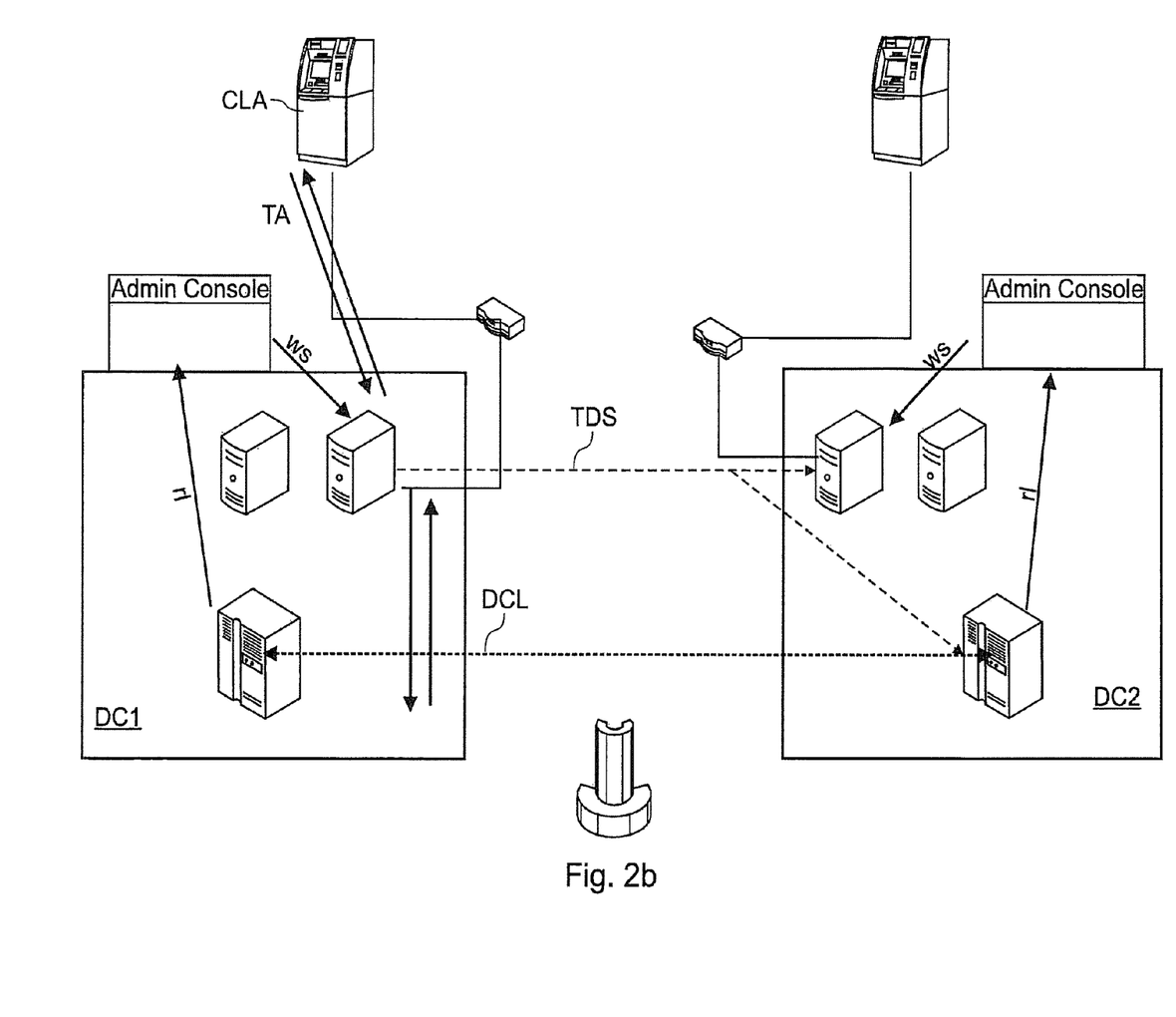

Referring to FIGS. 2a/b, normal operation is described in what follows when none of the computer centers fails:

In normal operation the processes for configuration changes takes place over both sides of the application servers ASC1 or ASC2 respectively, which then transmit the configuration changes to the respective databases. This principle is also called "distributed database transactions". This ensures that all computer centers, in this instance for example, DC1 and DC2, operate with the same configuration. The essential commands are: ws for "write sync", rl for "read local", and cc for "config changes". In a normal situation, therefore, both installations run more or less independently of each other.

Client CLA has computer DC1 as its preferred computer center and remains connected to the servers (clusters of PC/E servers) inside first computer center DC1. Processes such as charge back and settlement entries are also carried out by these servers. However, computer center DC2, as the backup data center, also has the master data from client CLA available so that it knows that this client is to be treated as a backup client for computer center DC2. All active clients CLA are shown as part of an active display status on the administrator console (Admin Console) of computer center DC1. Clients CLA are shown on the administrator console of the other computer center DC2 with the status "standby". The administrator consoles are part of the respective database management systems DBMS or DBMS2.

The configuration and changes to master data look as follows:

All changes within the configuration and master data are written in a Java transaction JTA into the database management systems DBMS1 and DBMS2 of the two computer centers DC1 and DC2. The following changes must be carried out for the PC/E servers:

An additional module, "Sync Master Data", is employed at the computer centers that performs an update of the master data themselves and of configuration at the remote locations with confirmation (acknowledge) from the remote cache system. The module runs at the computer centers and serves to keep the master data synchronous.

All program components (AdminBeans) in the PC/E server core that writes the master data or configuration have the "Sync Master Data" functionality as an option.

the PC/E (ProClassic/Enterprise) database persistence layer must be capable of retrieving the "Sync Master Data" module for each Save or Update request for a value item if it is necessary.

In the event of a dual change or modification at the same time, which results in a conflict, the save operation that detects the conflict first is interrupted and repeated.

Each PC/E instance possesses its own "only local" configuration for the following attributes among others:

Own location identifier

Backup location address and identifier

Sync status

The workstation master data have a field for the preferred computer center (primary center or data center identifier) that makes all processes capable of determining whether the client belongs to the current instance by default. The backup computer center (second location identifier) must also be configurable.

The Admin Console shows the clients that are in standby (workstations in which the preferred computer center (primary location identifier) is not the same as the current computer center).

An additional command (see SLC in FIG. 3c) is used to force the client to switch back from the second computer center to the first computer center.

The Admin Consoles are connected to each other over a link to ensure a message to both centers. It is thereby possible to log in to different Admin Consoles over a browser (tab browser).

The module for synchronizing transaction and status information is employed.

As far as events and commands are concerned, the following should be noted:

Generally, events are handled on site (locally) through each instance. Backend status or device status is not forwarded to the other instances (routing). For this reason, the client must send the current status information each time that it is re-connected to an instance in order to disable transactions, depending on the device list.

Forwarding of events to a separate server, such as Proview for example, is also carried out separately by each computer center. For this reason, the system must be capable of receiving events from the two different locations.

Commands can also be handled locally (only for currently connected clients). In order to achieve better usability, the PC/E Admin Console can have a button in order to switch over easily to the Admin Console that can issue the command to the client.

The difference consists specifically in the treatment of restrictions. Each restriction must be forwarded to the second location. In the case of a recovery of normal operation, the current restriction data record of the second location must be synchronized with that of the primary location.

As far as time-controlled server service or timer service is concerned, this is handled locally and executes all tasks only for those clients that are connected to the location at the time. Clients whose primary location is established on another instance are not dealt with unless there is a special need.

As far as the server services are concerned, they affect by default those customers that are not in standby mode. For example, the workstation timer service will handle only its own and connected systems.

As far as the journal is concerned, it is always written at the current location. In order to make a cross-search across computer centers possible, a second journal data sources configuration is employed. This allows a linked or common search for journal information for all clients that are connected to both computer center locations.

As far as transaction processing is concerned, the following description is with reference to FIG. 2b:

The processing of transactions TA is performed only inside each PC/E server instance and not across the computer center location. A transaction, or even a session, that was started at one location (e.g. at data center DC1), must be completed and concluded at the same location. In the event of failover, the client (in this case CLA for example) will start a new session at the new location (at data center DC2), but the session of the preceding location must be concluded in a defined manner.

The following information is prepared as part of an on-line mechanism for the remote location:
current restrictions
server-side counters that are not provided by the client during start-up
server-side transaction information that is required for the second location (e.g. customer daily limits)
cash dispenser or ATM servicing transaction (add cash, remove cash, etc.) information for the counters and clearing information.

This task is performed by a separate module in order to optimize the data volume and communications latency. The module runs at the computer centers and transmits the information described over data link DCL.

Concerning reporting (reporting/journal appender), it can be said that it makes sense for reporting and analyzing to configure a common, centralized system (either an on-line system or a separate database). All locations or systems DC1 and DC2 write the information into a table that contains the workstation and transaction information using a unique identifier. All data can also be written only locally, but this would make only local inquiries possible.

With reference to FIGS. 3a-3d, the case will be described in what follows in which one of the computer centers within the network fails.

Figure 3A:
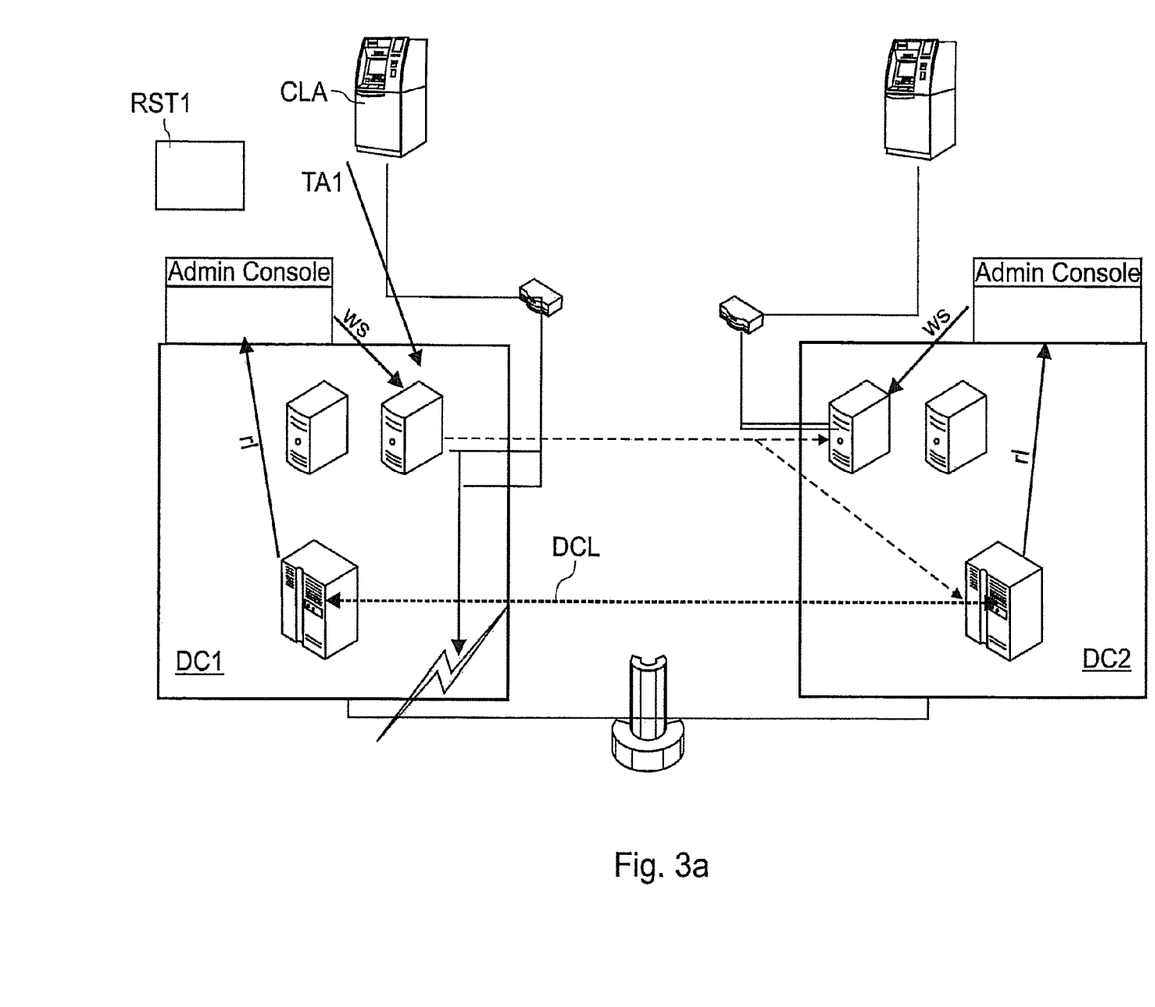
FIGS. 3a-3d illustrate a failure situation with subsequent recovery in which the preferred computer center fails for a certain period.

FIG. 3a illustrates the case in which preferred computer center DC1 fails, or the link to client CLA suffers interference. For active/active operation, client CLA continuously saves restart data for backup, i.e. its own backup data about the particular transactions initiated, such as restart data RST1 for transaction TA1. In the event of failure or interference, an attempt can be made, for client CLA for example, to complete transaction TA1 using preferred computer center DC1 using stored restart data RST1. To do this, client CLA first attempts to restore the link to preferred computer center DC1; the other computer center DC2 remains unaffected. The invention proceeds from the basic concept, or basic rule, that each transaction must be completed at that computer center where it was started. For example, transaction TA1 was begun (started or initiated) at first computer center DC1. Consequently, this transaction TA1 is also completed, or finalized, at first computer center DC1. If completed successfully, it results in an OK, otherwise in a cancel. Because of this basic rule, session data do not have to be transmitted (for example over link DCL) from one computer center (e.g. DC1) to the other (DC2), for example in the event of failover. Only such data need to be transmitted that allow the computer centers to monitor client operation. These data include information about restrictions and/or counter statuses. Consequently, the volume of data transmitted between computer centers is considerably reduced. In order to conform better to this basic rule, each client also creates for each computer center a file, or a container, in this case two containers C and C' (refer to FIG. 3b), in which it files restart data RST1 or RST2.

Figure 3B:
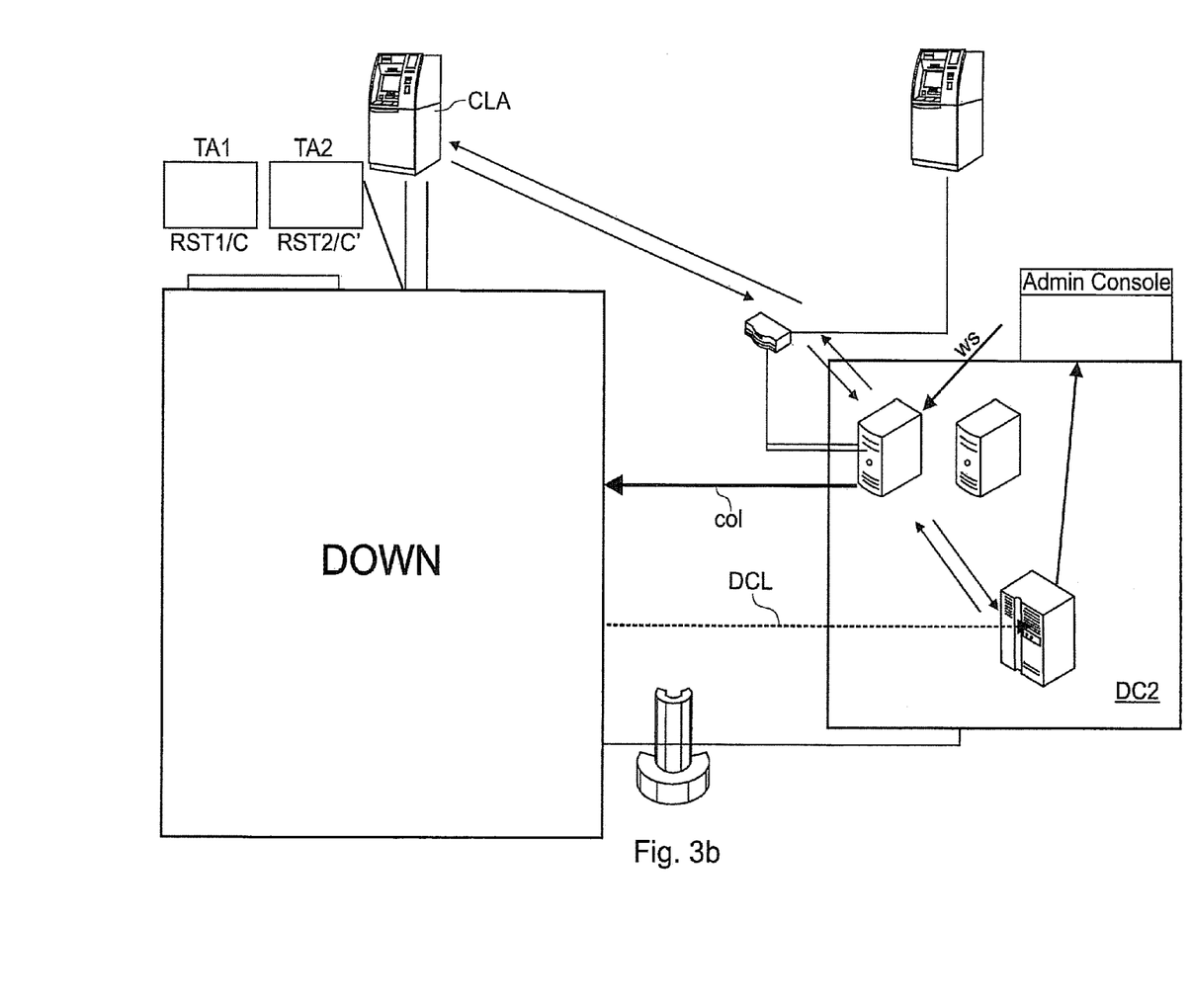

FIG. 3b shows the situation where first computer center DC1 has failed and a second transaction TR2 has already been started with second computer center DC2. In this instance, client CLA has saved locally both backup data RST1 for first transaction TA1 and backup data RST2 for second transaction TA2, but in different areas of containers C or C'. First transaction TA1 can only be finalized using computer center DC1 since it was started using this computer center. Second transaction TR2 can be carried out in its entirety and finalized using second computer center DC2, where this computer operates as backup service point for client CLA. Second computer center DC2 checks continuously whether first computer center DC1 is online. This is illustrated in FIG. 3b using the inquiry col "check online". As long as first data center DC1 is not online, second data transaction TA2 and subsequent are processed over computer center DC2.

This means that in the event of one of the computer centers (e.g. DC1) cannot be reached or is unavailable, the clients affected (in this case CLA) initiate an attempt to connect to the other computer center (in this case DC2). All configurations and master data are already available at the second location. During this time period all configuration changes are blocked.

A special configuration change mechanism, which is not replicated, is available to handle emergencies. This means that those changes have to be carried out manually at the second computer center.

The client will initially attempt to complete the transaction at the current computer center location. if this is unsuccessful, the current customer session is canceled and the restart for this transaction is saved at the client (refer to TA1 in FIG. 3a). The client will switch to the second location and carry out the normal start-up sequence in order to log in at the PC/E server instance (including device status and counter information).

The client will now know and communicate to the server that a transaction is still pending at the first location. The client must also ensure that the old restart data are preserved in a safe manner in order to complete this transaction immediately the computer center is online again, and the client will then switch back.

Figure 3C:
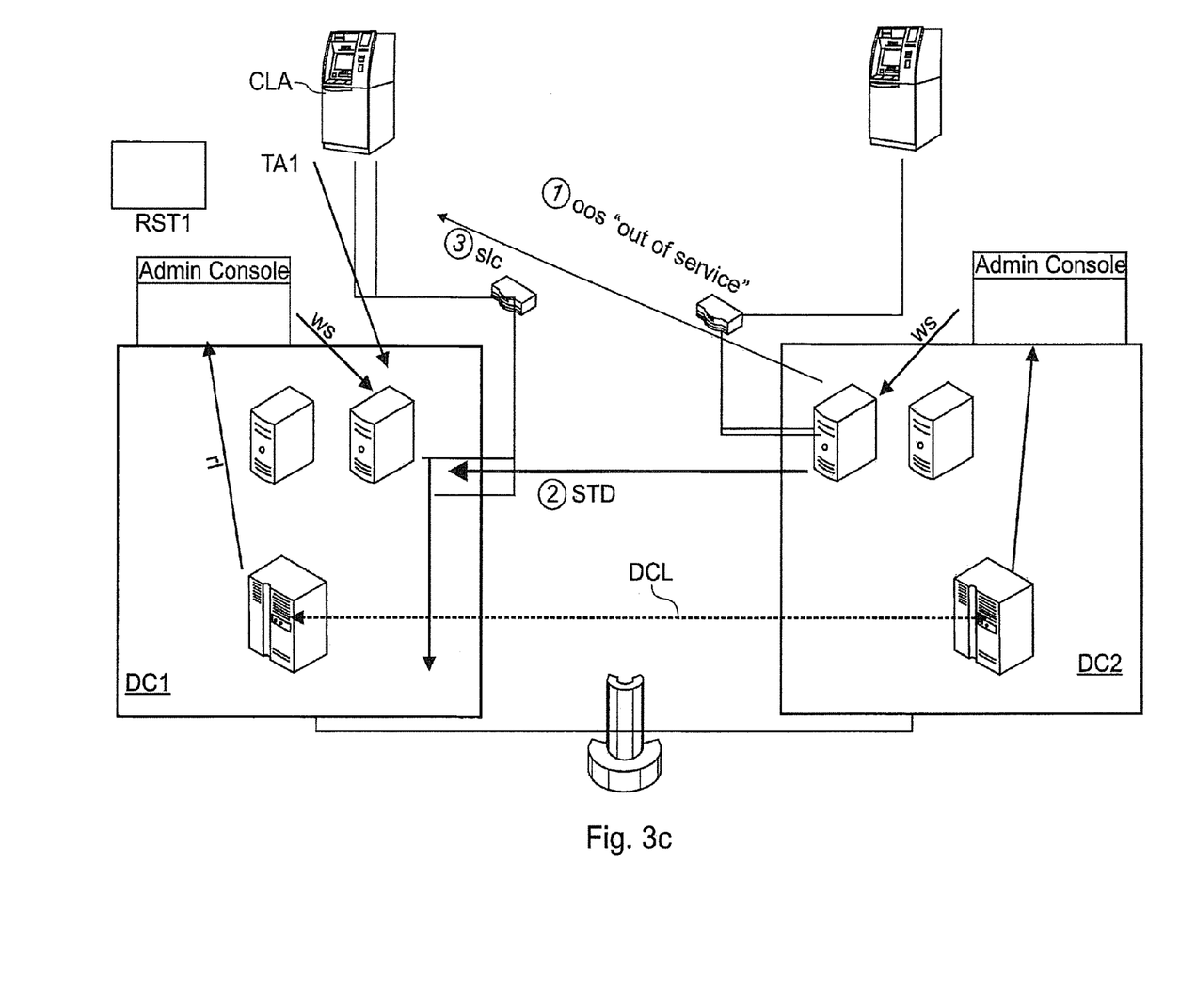
Figure 4:
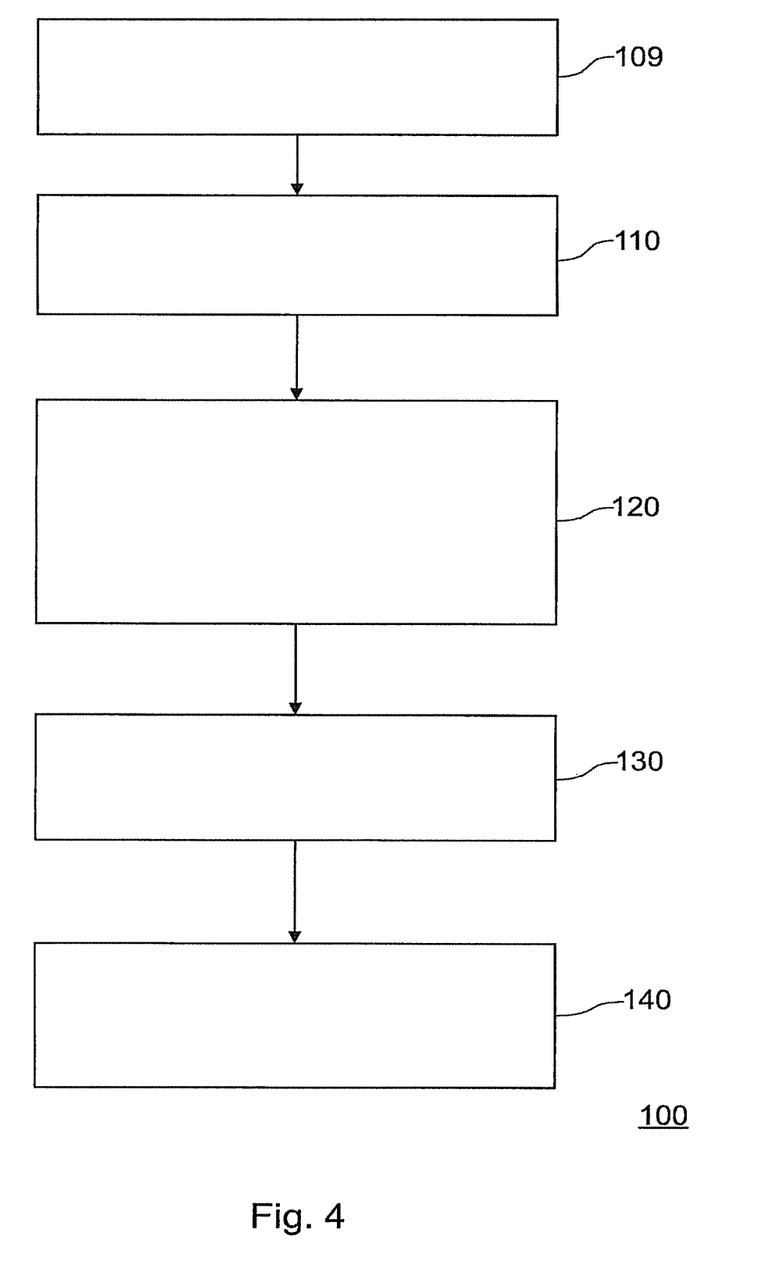
FIG. 4 shows a flow chart for the method in accordance with the invention.

FIG. 3c illustrates the situation where the preferred computer center DC1 goes online again. DC1 is thus operational again (see also step 109 in FIG. 4). This is signaled by DC1 (step 110 in FIG. 4). As soon as the second computer center DC2 establishes this (inquiry COL "check online"), synchronization STD of transactions ("Sync Transaction Data") can be carried out (steps 120-140 in FIG. 4). To ensure that no additional transactions are initiated or processes prompted originating from client CLA that could negatively affect synchronization, computer center DC2 initially sends in a first step "1" a command OOS "out of service" to client CLA in order to put said client out of service for a specific time period (see also step 120 in FIG. 4). Then the actual synchronization STD is carried out in a second step "2" (step 130 in FIG. 4). When synchronization with the first computer center DC1 is completed, the second data center DC2 sends a "switch location command" SLC to client CLA. This returns client CLA to operation, or activates said client (step 140 in FIG. 4).

Client CLA can then resume contact with the preferred computer center DC1 in order to finalize the still open transactions (in this case TA1).

Transaction clearing data can be treated in the following ways:

1) Processing at the Current Failure Node (Default):

The transactions that are processed at the second location are cleared and completed at the second location. If necessary, some transaction information is save in additional or own tables in order to synchronize said information back to the primary PC/E server for this work station.

2) Saving and Forwarding:

The clearing information (also EndOfDayProcessing) is saved until the primary location is online again and is then re-synchronized for later processing.

In other words, a separate clearing is carried out in order to combine information about all transactions of a client, independently of the computer center at which said transactions were conducted. This happens preferably at the preferred computer center (master).

Figure 3D:
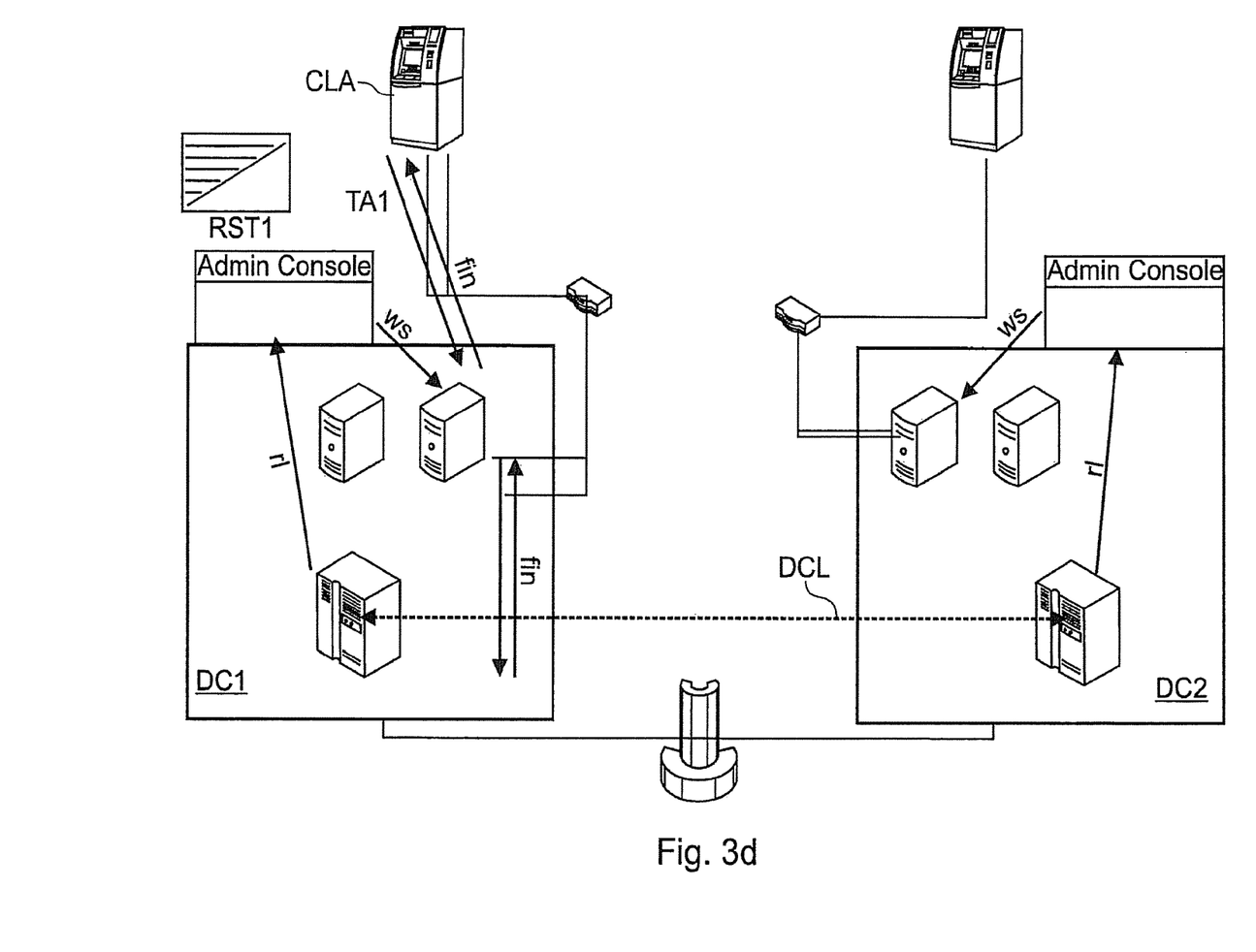

FIG. 3d illustrates a finalization at computer center DC1, namely the finalization of transaction TA1 that was begun at this same computer center DC1 but which could not yet be completed (see also comment or operating fin). During a failover (see FIG. 3b) because of a failure of the first computer center DC1, all new transactions (e.g. TA1) were started at the backup computer center DC2 and are also completed at said computer center.

A client that was capable of successfully opening or establishing a link to the second location will not switch back to the primary location until it receives a specific server command, namely this "switch location command" SLC. This ensures defined workstation status on the server side.

As soon as the PC/E instance is contacted by a client in a failover scenario, the PC/E server will attempt to connect to the other location, viz. through the inquiry COL "check online". Only when communication is restored will the second server attempt to move or to switch the clients back to the primary location. The primary location can contact the second location as an alternative or additional location to prompt the switch back.

In this case, the server will also issue a message "location switch not permitted" as a restriction for all clients that have treated the server as primary server. It is necessary to avoid switching own clients if the data cannot be re-synchronized to a location that is temporarily switched off or down. If the location is back, the current data must be the first to be re-synchronized, in addition to the data of the backup client (see also FIG. 3b/c).

Failure recovery can also be carried out as follows (see in particular FIG. 3c):

As soon as the primary location for the client is online again (in this case DC1 for client CLA), the primary location will attempt to contact the backup location (in this case DC2). As soon as the link between both clusters is established (in this case over DCL), the second location sends the transaction data to the primary location.

To do this, the client (in this case CLA) goes out of service for a brief time (see step "1" in FIG. 3c) with the command "out of service", when all storage and forwarding data a re-synchronized (see step "2" STD), and finally the client receives the command to switch back to the primary location (see step "3" with "switch location command").

If several clients are active (cluster CLA in FIG. 1), then this sequence can also be carried out for one client in sequence. The clients are then re-routed one after the other since the stored transaction data must be transmitted to the second location in advance. After that, processing can be continued in the normal way.

In the event that the client has outstanding re-start data for the primary location, normal error handling is carried out in order to delete the session information on the server as well.

Clients that have their primary location at computer center DC2 (in these case clients will likewise forward the required transaction counter data to make the switch to computer center DC2 possible. This is carried out by deletion or cancelation of specific restriction "no location switch permitted". This ensures that the required data of the clients of computer center DC2 are re-synchronized during the downtime of computer center DC1 before a client uses this computer center DC2 as backup.

This means that after forwarding the backup client data from computer center DC2 back to computer center DC1 and updating the client data originating from computer center DC2 to computer center DC1, normal data processing resumes.

As far as business continuity is concerned, in the event that it is not possible to re-activate the primary, or preferred, computer center (in this case DC1), the primary location for a client can be switched over. The new preferred location can either be the existing backup location (in this case DC2) or a completely different computer center. For this reason a way is provided by means of a configuration export to construct a new location on the basis of the existing master data and configuration.

The following can be said concerning the latency of the cross-link between the computer centers.

Since the invention maintains at least two instances in different computer centers, it is necessary to handle network affairs in the cross-link. If the network cross-link were completely interrupted (down), this would be regarded as a disaster for the computer centers if the previously described failover process were not available.

If synchronization transaction data should not be replicatable for the second location, the client will initially receive the restriction "no location switch". The restriction is an indication for the resynchronization process to update the second location first before the restriction is lifted. This treatment has been inserted for the reason that a customer transaction would not be affected by the synchronization process per se.

In summary and referring specifically to FIGS. 3c and 3d, it can be said that in all the cases mentioned fail-safe synchronization STD between the computer centers involved (in this case DC1 and DC2) is necessary. In order not to negatively affect synchronization, client CLA is, or the affected clients are, put out of service temporarily one after the other. The time period corresponds essentially to the latency for data synchronization and amounts to less than one minute. Accordingly, the invention is particularly suitable for active/active operation using widely separated computer centers. Other forms of operation, such as active/passive or active/hot standby, which are used at widely separated computer centers, have substantially longer downtimes of several hours as a consequence and they can easily last for a half to an entire day.

Putting a backup client (in this case CLA) out of service by a backup computer center (in this case DC2), as proposed here, can be performed sequentially at several clients. The invention can preferentially be employed also at release changes.

What is claimed:

1. A method for securely switching a client back to a first computer center after the client was connected to a second computer center during downtime of the first computer center, said method comprising:
   determining that the first computer center is operational again;
   causing the client to go out of service when the first computer center is determined to be operational again;
   synchronizing configuration and/or transaction data between the first computer center and second computer center while the client is out of service; and
   once synchronizing is completed, prompting the client to return to operation and to switch back to the first computer center.

2. The method from claim 1, wherein the client is a self-service terminal, selected from the group of a cash dispenser (ATM), account statement printer or money transfer terminal, that is normally connected to the first computer center and is only connected to the second computer center during downtime of the first computer center.

3. The method from claim 1, wherein the first and second computer centers and associated databases are operated in active/active mode.

4. The method from claim 1, wherein several transaction terminals are switched back to the first computer center as a cluster of clients by causing one client after another to go out of service.

5. The method from claim 1, wherein for each transaction a backup data record is stored locally on the client, where the individual backup data record is stored in a first data container when the associated transaction is performed using the first, preferred computer center, or in a second data container when the associated transaction is carried out using the first computer center.

6. The method from claim 1, wherein when the second computer center is informed over a specifiable time period that the first computer center is not operational, the second computer center or another computer center being assigned to the client as the preferred computer center.

7. A network structure to execute the method from claim 1 having a first computer center at a first location and at least a second computer center that is provided at a second location for failover of the first computer center, where at least one transaction terminal is connected as a client to the second computer center during downtime of the first computer center in order to be switched back to the first computer center at the end of the downtime, wherein the second computer center sends an inquiry to the first computer center at specifiable intervals to inquire whether the first computer center is operational again; in that the second computer center sends a command to the client to cause the client to go out of service; in that the second computer center carries out synchronization of configuration transaction data with the first computer center over a data link; and in that at the conclusion of synchronization, the second computer center sends an additional command to the client to cause the client to switch back to the first computer center.

* * * * *